Aug. 4, 1964   J. W. ADAMS ETAL   3,143,653
PHOTOSENSITIVE ELECTROLUMINESCENT INDICATING APPARATUS
Filed June 1, 1961   4 Sheets-Sheet 1
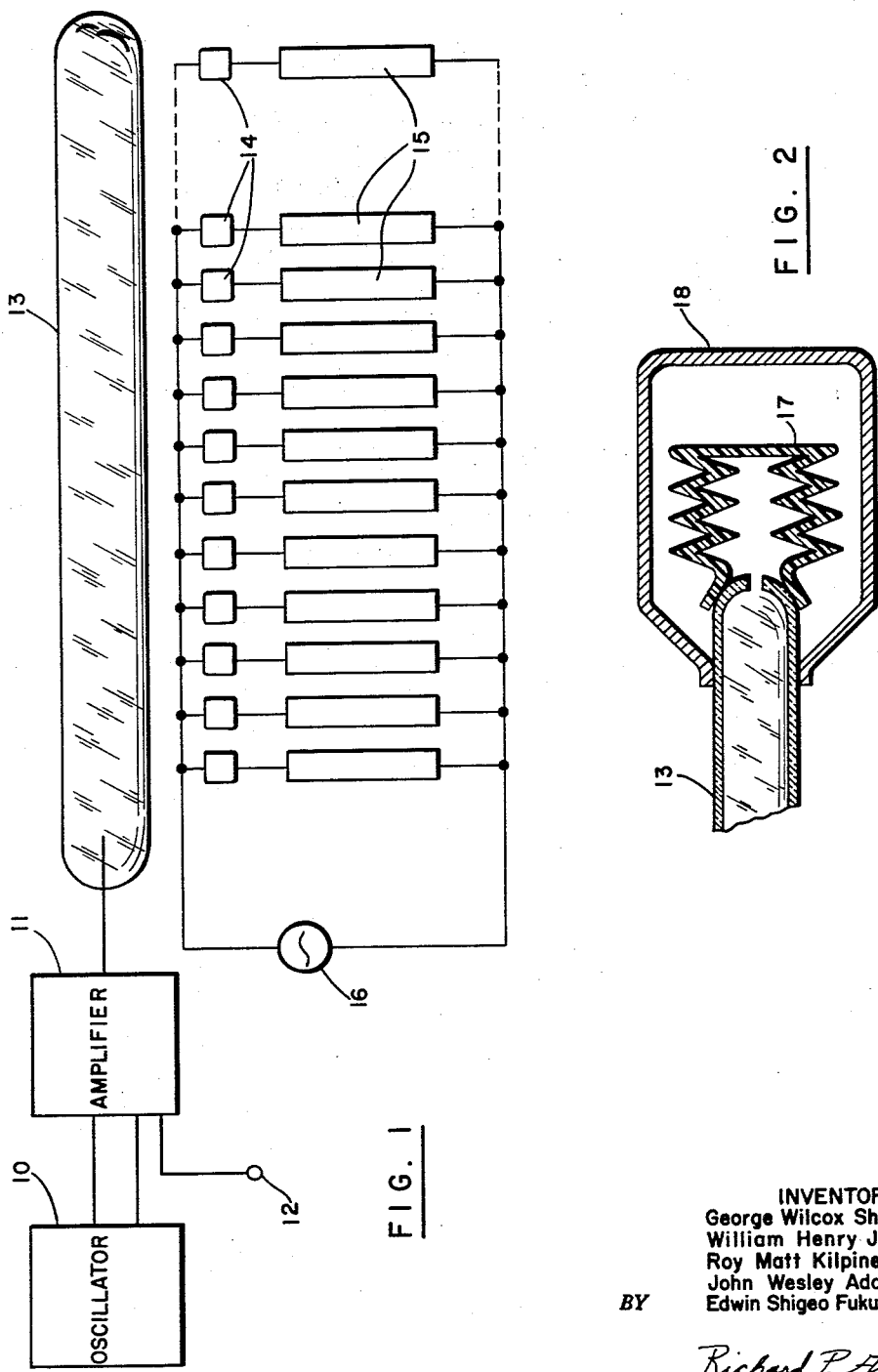
INVENTORS.
George Wilcox Shreve
William Henry Jones
Roy Matt Kilpinen
John Wesley Adams
Edwin Shigeo Fukumoto
BY Richard P. Alberi
AGENT

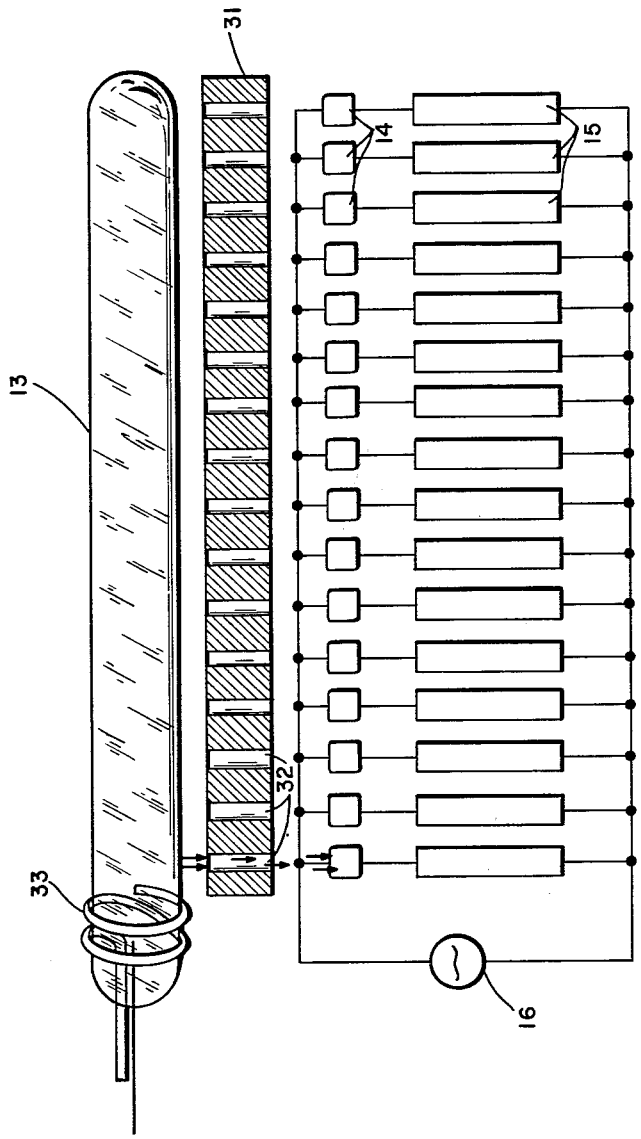

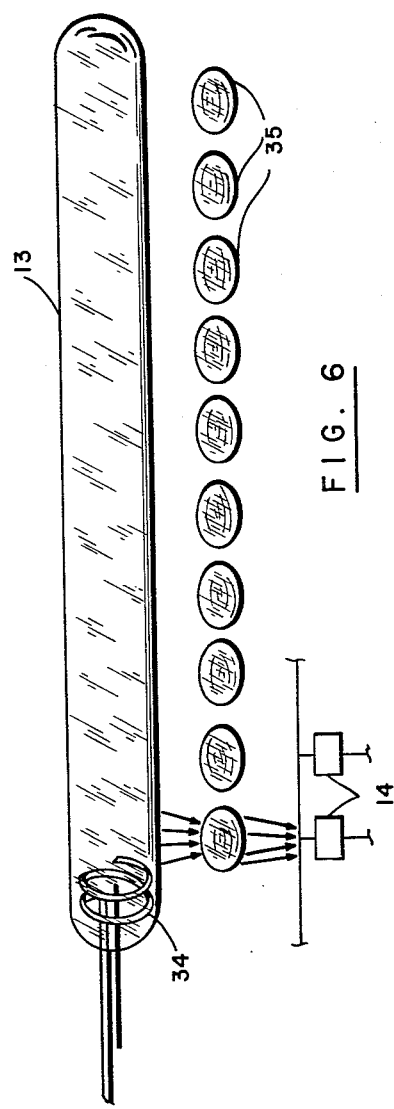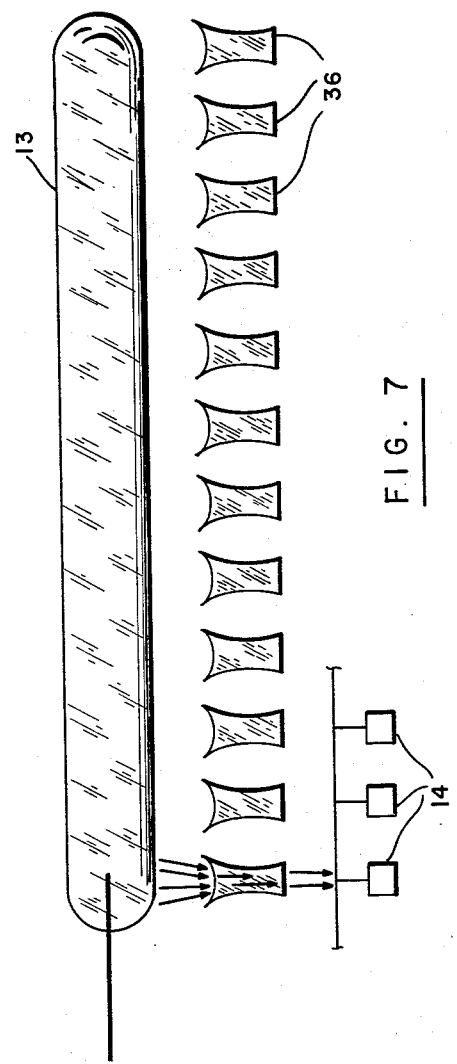

United States Patent Office 3,143,653
Patented Aug. 4, 1964

3,143,653
PHOTOSENSITIVE ELECTROLUMINESCENT
INDICATING APPARATUS
John Wesley Adams, Canoga Park, Roy Matt Kilpinen, Inglewood, Edwin Shigeo Fukumoto, Los Angeles, William Henry Jones, Santa Monica, and George Wilcox Shreve, Menlo Park, Calif., assignors, by mesne assignments, to Lear Siegler, Inc., Santa Monica, Calif., a corporation of Delaware
Filed June 1, 1961, Ser. No. 114,167
15 Claims. (Cl. 250—208)

This invention pertains to indicators and more particularly to indicators for visual readout.

In the past visual readout indicators have required the use of a mechanical pointer driven by a motor and a series of gears, a tape driven by a motor, or a mask on the face of the instrument driven by a motor and a series of gears. The obvious disadvantage of such indicators is that the use of gears limits the accuracy of the indicator and the use of any moving parts limits the reliability of the indicator. The response time of mechanical gears is also a big disadvantage. In the indicators presently used, the lifetime is determined by the reliability of the moving parts of the indicator. Furthermore, present indicators because they use gears and motors to drive them are highly complex. Another type of indicator is the pointer type indicator using the D'Arsonval principle. The disadvantage of the D'Arsonval type indicators is that it again is mechanical movement and like the previously mentioned indicators is subject to errors due to gravity and acceleration forces. It is, therefore, seen that a need exists for an improved type of indicator.

It is, therefore, an object of this invention to provide an indicator with no mechanical moving parts.

Another object of this invention is to provide an indicator which is controlled by a low voltage analog input.

Still another object of this invention is to provide an indicator which is smaller, more reliable, and less complex than present indicators.

A further object of this invention is to provide an indictor which is not rendered inoperative or erroneous by gravitational and/or acceleration forces.

The above and other objects of this invention are accomplished by an indicator utilizing a column of individual electroluminescent strips in series respectively with a series of photoconductive cells, and a gaseous tube. The height of the illuminated column in the gaseous tube switches the photoconductive cells, which in turn, applies an increase in potential to the respective electroluminescent strips to cause the electroluminescent strips to illuminate.

A better understanding of the objects and advantages of the present invention will be had from the following description when take in conjunction with the drawings:

FIG. 1 is a block diagram of the present invention;

FIG. 2 is a second embodiment of the present invention;

FIG. 5 is a drawing of another embodiment of the present invention;

FIG. 6 is a drawing of still another embodiment of the present invention; and

FIG. 7 is a drawing of yet another embodiment of the present invention.

Figure 3:
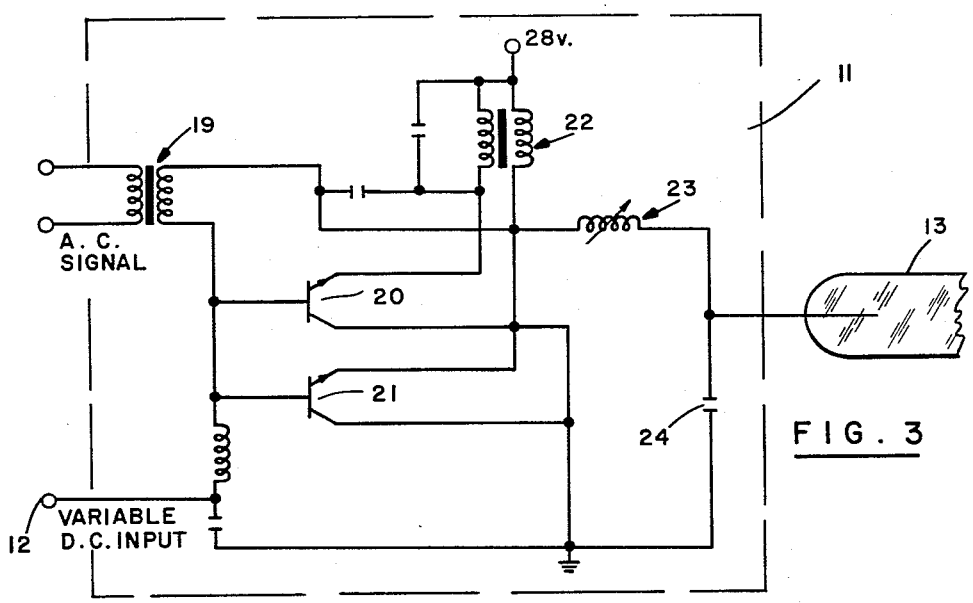
FIG. 3 is a schematic of a first variable gain amplifier circuit of the present invention.

There is shown in FIG. 1 an oscillator 10 and a variable gain amplifier 11. The variable gain amplifier 11 is connected and responsive to the output of the oscillator 10 and also to the variable direct current input on terminal 12. The variable direct current on input terminal 12 can come, for example, from an oil pressure transducer or a temperature transducer. A tube 13 filled with an inert gas, for example, neon, which will illuminate when subjected to the proper radio frequency, is electrically connected to the output of amplifier 11. The amplitude of the output of amplifier 11 determines the length of the illuminating output column in tube 13. All of the inert gases will illuminate but some require more power than others and the color of illumination is different. It has been found that the preferable gas is neon or a combination of neon and argon and/or mercury. Also, argon by itself, is very satisfactory. The foregoing mentioned gases and combinations require low power to illuminate and have illumination color which is easy to see, and to use for other purposes in connection with photoconductive material. The tube 13 is made of a glass or other transparent material so that the illumination is visible through the tube 13. With the oscillator 10 having a given output, the length of illuminated column in the tube 13 is constant until the input at terminal 12 varies. It can be seen, therefore, that the length of the illuminated column in the tube 13 is varied by and is proportional to the magnitude of the input on terminal 12.

The gas tube may be used as a direct readout or can be used to switch a series of photoconductive cells positioned along the length of the gas filled tube 13 as shown in FIG. 1. The photoconductive cells can be the type commonly known in the art and individually packaged or they can be of the type shown and described in United Sttaes Patent Number 2,876,202, "Photoconducting Powders and Method of Preparation," by C. J. Busanovich et al., or the equivalent.

A number of electroluminescent strips 15 are connected in series with an equal number of photoconductive cells 14. The electroluminescent strips can be made of the material shown and described in the United States Patent Number 2,731,423, "Electroluminescent Materials and Method of Preparation," by J. S. Prener, or any other luminescent material well known in the art. Since the electrodes are normally on both surfaces of the electroluminescent material, it at least should have one electrode transparent to enable the viewer to see the electroluminescent strips emit light. An alternating current source 16 has one lead connected to the one side of all of the photoconducting cells and the other lead connected to one side of all of the electroluminescent strips. This places a given photoconducting cell in series with a given electroluminescent strip.

In operation, as the length of the illuminated column in the tube 13 increases or decreases, the photoconductive cells opposite the illuminated column are rendered conducting, thereby allowing current to flow through their respective electroluminescent material, causing the electroluminescent strip or strips to emit light. The number of illuminated electroluminescent strips being equal to the number of photoconductive cells subjected to the illumination in the tube 13.

It can be seen now that the photoconductive cells 14 are spaced apart along the tube 13 and the electroluminescent strips 15 may be positioned close together so that a change in the length of the illuminated column in tube 13 is defined by the illumination or non-illumination of a respective electroluminescent strip.

One of the parameters to be considered in programming or predicting the length of the illuminated column in the tube 13 is the pressure in the tube 13. It is, therefore, advisable in some applications to provide a temperature compensation means as shown in FIG. 2, whereby a bellows 17 is positioned on the end of the tube 13, and the bellows 17 and end of tube 13 are completely enclosed by a housing 18 which maintains a constant pressure. Depending upon the type of bellows 17 used, the pressure inside the housing 18 is higher or lower than the pressure in the tube 13. The bellows expand or contract keeping the pressure in the tube 13 relatively constant.

Referring to FIG. 3, the first amplifier circuit is shown. The output of oscillator 10 is directly connected to the input coil of transformer 19. One side of the output coil of transformer 19 is connected to the base of two transistors 20 and 21; the use of two transistors allows the amplifier to have a higher power rating. When transistors 20 and 21 are switched on, as hereinafter described, the tank circuit 22 is pulsed providing an output through the variable inductor 23 to the tube 13. The output of the tank circuit 22 is also fed back to the other side of the output winding of transformer 19 where it is added with the input signal to transformer 19 to provide extra power. The input on the variable direct current terminal 12 varies the direct current carrier of the input signal to the transistors 20 and 21, thereby determining the magnitude of the signal passed through transistors 20 and 21, and, consequently, the magnitude of the signal delivered to the tube 13. Capacitor 24 connected between the output of the inductor 23 and ground, completes the circuit of the output, and capacitor 24 may be replaced by one or two capacitors having temperature characteristics to stabilize the inductor 23 and maintain a series tuned circuit. The temperature sensitive capacitors may be the type commonly known which vary capacitance as a function of temperature.

In operation, a constant alternating current is fed to the base of transistors 20 and 21. The variable direct current is also fed to the base of transistors 20 and 21. It can be seen now that as the direct current signal goes more negative, less and less alternating current signal will be allowed to switch the transistor into the conducting state. Conversely, when the direct current signal goes more positive, more of the alternating current signal switches the transistors on, allowing a pulsating signal of greater magnitude to pass in to the tank circuit 22. The output of tank circuit 22 passes to inductor 23 which increases the voltage applied to one end of tube 13, thereby activating the gas in tube 13. The length of the illuminated column of gas in tube 13 is a function of the magnitude of the output of tank circuit 22 and, consequently, it is a function of the variable direct current input on terminal 12. The input on terminal 12 may be from any transducer or sensor, for example, an engine r.p.m. sensor, or an oil pressure transducer.

Figure 4:
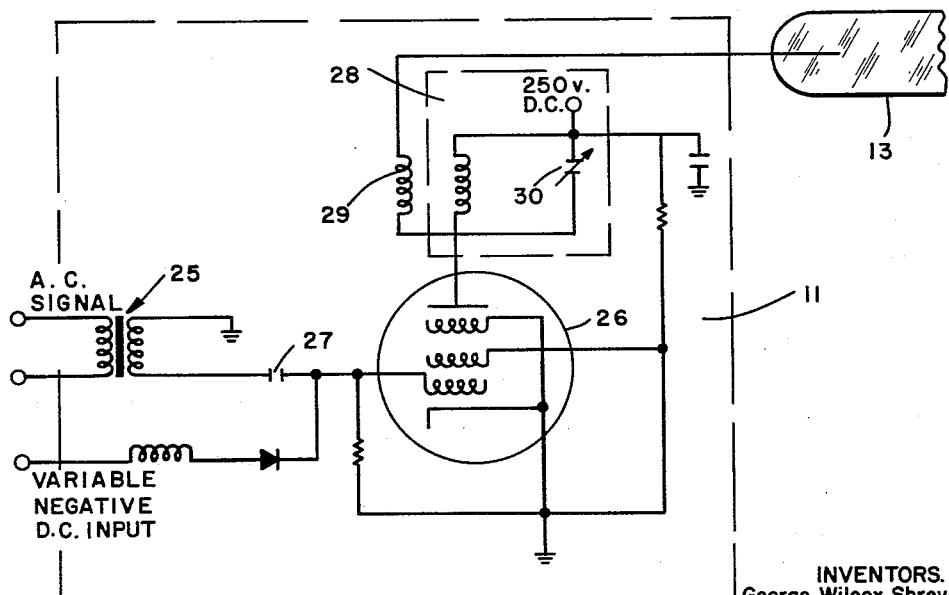
FIG. 4 is a schematic of a second variable gain amplifier circuit of the present invention.

FIG. 4 is a second embodiment of a variable gain amplifier circuit. The output of oscillator 10 is directly connected to the input of transformer 25. The output of transformer 25 is connected to the input of the tube 26 by way of capacitor 27. The output of tube 26 is directly connected to the input of tank circuit 28. The output of tank circuit 28 is directly connected to the coil 29 and the output of coil 29 is connected to the gas filled tube 13. The variable input terminal 12 is connected between the capacitor 27 and the tube 26. As is the case in FIG. 3, the input on terminal 12 sets the negative bias on the tube 26, thus determining what portion of the positive alternating signal switches tube 26 into conduction. When the tube 26 conducts the tank circuit 28 is pulsed. The magnitude of the output of tank circuit 28 is dependent upon the amplitude of each positive cycle of the input alternating signal. The output of tank circuit 28 passes to the coil 29 which steps up the applied alternating voltage to tube 13. Therefore, the magnitude of the input to tube 13 is again a function of the magnitude of the negative input signal on terminal 12. In this circuit the output of the tank circuit 28 is tunable by the capacitor 30 in the tank circuit 28. Obviously, the tank circuits in either FIG. 3 or FIG. 4 can be inductively or capacitively tuned.

It is possible to use a shutter plate 31 between the gas filled tube 13 and the photoconductive cells 14 as shown in FIG. 5. The shutter plate 31 has holes or slots 32 therein which allow the light to pass through and fall upon the respective photoconductive cell without any of the light from that particular slot passing onto the next photoconductive cell. By this arrangement the tendency of the illuminated column in tube 13 to partially "fire" the next photoconductive cell is lessened. In the event that, the illuminated column in tube 13 is not proportional to the magnitude of the alternating input signal, then the slots are positioned along the tube 13 so that the number of electroluminescent cells illuminated is proportional to the magnitude of the alternating input signal to tube 13.

In some applications it is necessary to maintain a constant temperature in tube 13. In FIG. 5 there is shown a heater coil 33 at the base of the tube 13. The current flow through the heater coil 33 is controlled by methods well known in the art with the aid of a thermocouple, or the like.

In FIG. 6 there is shown still another means of heating the tube 13. The heater coil 34 is placed inside the base of the tube 13. The results are the same as the heater coil being on the outside of the tube 13. Also, in FIG. 6 there is shown lenses 35 positioned between the tube 13 and the photoconductive cells 14. The lenses are used to focus the light emitted by the tube 13 into the photoconductive cells 14. The lenses 35 may be used in various forms, for example, some can be smaller than others in length so as to again make the number of electroluminescent cells which are illuminated proportional to the magnitude of the alternating input signal to tube 13.

In FIG. 7 there is shown still another means of directing the light emitted by the tube 13 to the photoconductive cells 14. Pieces of Lucite 36 or the like, are shaped in such a manner as to have the end next to the tube 13 larger in size than the end next to the photoconductive cells 14. The pieces of Lucite 36 are coated on the outside with a material having an index of refraction lighter than that of the Lucite, consequently, the light entering the end near the tube 13 is focused on the photoconductive cells 14. Again, the pieces of Lucite 36 may be made of different shapes to compensate for the height of the illuminated column in tube 13 not being proportional to the alternating input signal to tube 13.

It can be seen now that this invention provides an indicator having no mechanical moving parts, being simple in construction, and thereby more reliable, smaller in size, and requiring less power than previous indicators. Since there are no moving parts, the instrument is not subject to errors due to acceleration or gravitational forces.

Another embodiment of this invention is the use of a small amount of radioactive material, for example, krypton 85, in the tube together with the gas. The radioactive material brings the gas to a point of almost firing, and thereby reduces the amount of power required to illuminate the gas in the tube.

Still another embodiment of this invention is the application of direct current to the base of the tube in place of the alternating current.

Although the device of this invention has been described in detail above, it is not intended that it should be limited by the above description, but only in accordance with the spirit and scope of the following claims.

We claim:

1. An indicator comprising a gas filled tube, variable gain amplifier means having an output to illuminate a portion of said gas such that said illuminated gas forms a variable column of light, means connected to said amplifier to vary the gain thereof, a series of photoconductive cells in close proximity of said tube such that the illumination of said gas renders at least one of said photoconductive cells conductive, the number of photoconductive cells rendered conductive being a function of the length of said variable column of light, a series of electroluminescent areas equal in number to the number of said photoconductive cells, a power source, each of said electroluminescent areas being individually electrically connected to said power source by way of a respective photoconductive cell such that said respective photoconductive cell acts as a switch to cause electrical energy to activate or deactivate said electroluminescent area.

2. The device as claimed in claim 1 wherein said amplifier means comprises a transformer, at least one transistor switch electrically connected and responsive to the output of the said transformer, said means to vary the gain of said amplifier also being electrically connected to said transistor, a tank circuit electrically connected and responsive to the output of said transistor switch, the output of said tank circuit being the output of said amplifier.

3. The device as claimed in claim 1 wherein said amplifier comprises a switching tube, a transformer connected and responsive to said first circuit means, said switching tube being electrically connected and responsive to the output of said transformer, a tank circuit electrically connected and responsive to the output of said switching tube, the output of said tank circuit being the output of said amplifier.

4. The device as claimed in claim 1 and further comprising a heater coil wound around a portion of said transparent housing and two temperature sensitive capacitors in said amplifier electrically connected to compensate for the variable inductance in the variable gain amplifying means due to temperature changes.

5. An indicator comprising first circuit means providing alternating current, variable gain amplifier means connected and responsive to the output of said first circuit means, means connected to said amplifier to vary the gain thereof, a gaseous column connected and responsive to the output of the said variable gain amplifier whereby a portion of the said gaseous column is illuminated and the portion illuminated is proportional in length to the output of said variable gain amplifier, said gaseous column being confined in a transparent housing, a series of photoconductive cells arranged along said gaseous column and in visible range of said gaseous column such that as the illuminated portion of the gaseous column increases in length more of the said photoconductive cells are placed in the conducting state due to the illumination of the gaseous column falling on said photoconductive cells, a second source of electrical power, a series of electroluminescent strips equal in number to the number of said photoconductive cells arranged in a column and each individually connected in series to a respective photoconductive cell and also to said second source of electrical power such that successive electroluminescent strips are illuminated as their respective photoconductive cells are rendered conducting by illumination of said gaseous column.

6. The device as claimed in claim 5 further comprising a mask having openings therein, said masks being positioned between said gaseous column and said photoconductive cells and said openings being equal in number to said photoconductive cells and each opening being positioned in line with a respective photoconductive cell.

7. The device as claimed in claim 5 further comprising a series of optic lenses equal in number to the number of said photoconductive cells and positional between said photoconductive cells and said gaseous column such that a single lens focuses the illumination of said gaseous column of a respective photoconductive cell.

8. The device as claimed in claim 5 and further comprising a series of light conducting pieces of material equal in number to the number of said photoconductive cells and positioned between said photoconductive cells and said gaseous column, said pieces of material being larger at the end adjacent the gaseous column and smaller at the end adjacent to its respective photoconductive cell thereby causing the illumination entering the piece of material from the side adjacent the gaseous column to be concentrated upon the respective photoconductive cells.

9. The device as claimed in claim 5 and further comprising heater coils positioned around a portion of said transparent housing to maintain the temperature inside said transparent housing constant.

10. The device as claimed in claim 5 and further comprising bellows means positioned at the end of said transparent housing such that one side of the bellows is pneumatically connected to the inside of said transparent housing to maintain the pressure inside said transparent housing substantially constant.

11. The device as claimed in claim 5 wherein said amplifier comprises means to compensate the output of said amplifier in response to temperature changes in the amplifier circuit.

12. The device as claimed in claim 5 wherein said amplifier means comprises a transformer, at least one transistor switch electrically connected and responsive to the output of the said transformer, said means to vary the gain of said amplifier also being electrically connected to said transistor, a tank circuit electrically connected and responsive to the output of said transistor switch, the output of said tank circuit being the output of the said amplifier.

13. The device as claimed in claim 5 wherein said amplifier comprises a swiching tube, a transformer connected and responsive to said first circuit means, said switching tube being electrically connected and responsive to the output of said transformer, a tank circuit electrically connected and responsive to the output of said switching tube, the output of said tank circuit being the output of said amplifier.

14. The device as claimed in claim 5 and further comprising a heater coil wound around a portion of said transparent housing and two temperature sensitive capacitors in said amplifier electrically connected to compensate for the variable inductance in the variable gain amplifying means due to temperature changes.

15. An indicator comprising first circuit means providing alternating current, variable gain amplifier means connected and responsive to the output of said first circuit means, means connected to said amplifier to vary the gain thereof, and a gaseous column connected and responsive to the output of the said variable gain amplifier whereby a portion of the said gaseous column is illuminated and the portion illuminated is proportional in length to the output of said variable gain amplifier, said gaseous column being confined in a transparent housing, and wherein said amplifier comprises capacitor means to compensate the output of said amplifier in response to temperature changes in the amplifier circuit.

References Cited in the file of this patent
UNITED STATES PATENTS

| | | |
|---|---|---|
| 2,006,081 | Anderson et al. | June 25, 1935 |
| 2,523,287 | Friedman | Sept. 26, 1950 |
| 2,573,373 | Wales | Oct. 30, 1951 |
| 2,764,178 | Paul et al. | Sept. 25, 1956 |
| 2,897,720 | Offner | Aug. 4, 1959 |
| 2,909,668 | Thurlby et al. | Oct. 20, 1959 |